United States Patent
Sheng et al.

(10) Patent No.: US 12,534,427 B2
(45) Date of Patent: Jan. 27, 2026

(54) METHOD FOR PREPARING CHIRAL 4-ARYL-β-AMINO ACID DERIVATIVE

(71) Applicants: Zhejiang Medicine Co., Ltd. Xinchang Pharmaceutical Factory, Zhejiang (CN); Zhejiang Changhai Pharmaceutical Co., Ltd., Zhejiang (CN)

(72) Inventors: Li Sheng, Shaoxing (CN); Xufeng Wu, Shaoxing (CN); Dadong Shen, Shaoxing (CN); Gang Fan, Shaoxing (CN); Pengcheng Liu, Shaoxing (CN); Dengfeng Dong, Shaoxing (CN)

(73) Assignee: ZHEJIANG MEDICINE CO., LTD. XINCHANG PHARMACEUTICAL FACTORY, Zhejiang (CN)

( * ) Notice: Subject to any disclaimer, the term of this patent is extended or adjusted under 35 U.S.C. 154(b) by 569 days.

(21) Appl. No.: 17/924,261

(22) PCT Filed: Mar. 12, 2021

(86) PCT No.: PCT/CN2021/080631
§ 371 (c)(1),
(2) Date: Nov. 9, 2022

(87) PCT Pub. No.: WO2021/227641
PCT Pub. Date: Nov. 18, 2021

(65) Prior Publication Data
US 2023/0174461 A1    Jun. 8, 2023

(30) Foreign Application Priority Data
May 11, 2020    (CN) .......................... 202010394976.7

(51) Int. Cl.
C07C 231/12 (2006.01)
C07C 227/32 (2006.01)
C07D 487/04 (2006.01)

(52) U.S. Cl.
CPC .......... *C07C 231/12* (2013.01); *C07C 227/32* (2013.01); *C07D 487/04* (2013.01); *C07B 2200/07* (2013.01)

(58) Field of Classification Search
None
See application file for complete search history.

(56) References Cited

U.S. PATENT DOCUMENTS 7,468,459 B2 * 12/2008 Xiao ................... B01J 31/2295
                                                        564/336
8,278,486 B2 * 10/2012 Wu ....................... C07D 487/04
                                                        564/193
9,745,309 B2 *  8/2017 Lin ....................... C07D 487/04

FOREIGN PATENT DOCUMENTS

| CN | 1761642 A | 4/2006 |
| CN | 1972898 A | 5/2007 |
| CN | 102271504 A | 12/2011 |
| CN | 103087105 A | 5/2013 |
| CN | 104418861 A | 3/2015 |
| CN | 105859783 A | 8/2016 |
| WO | WO-2006065826 A2 | 6/2006 |
| WO | WO-2009064476 A1 | 5/2009 |

OTHER PUBLICATIONS

Tang, W., et al., "Novel, Tunable, and Efficient Chiral Bisdihydrobenzooxaphosphole Ligands for Asymmetric Hydrogenation," Organic Letters, 12(1): 176-179 (2010).
Li, S., et al., "Rhodium/(2S,2'S,3S,3'S)-3,3'-Di-tert-butyl-4,4'-dimethoxy-2,2',3,3'-tetrahydro-2,2'-bibenzo[d][1,3]oxaphosphole (MeO-BIBOP) Catalyzed Synthesis of (R)-3-tert-Butoxy-carbonylamino-4-(2,4,5-tri-fluorophenyl)butyric Acid by Asymmetric Reduction of Enamines," Chin. J. Org. Chem. 41: 2105-2111 (2021).

* cited by examiner

*Primary Examiner* — Brian J Davis
(74) *Attorney, Agent, or Firm* — Harness Dickey & Pierce P.L.C.

(57) ABSTRACT

The present invention provides a method for preparing a chiral 4-aryl-β-amino acid derivative. The preparation method comprises hydrogenating an enamine compound having a structure as shown in Formula III in an organic solvent in the presence of a catalyst containing a transition metal and BIBOPs. The preparation method of the present invention uses a small amount of a selected asymmetric catalyst, and has a simple operation, mild reaction conditions, a high yield, a high stereoselectivity, and better industrial application and economic values.

8 Claims, No Drawings

METHOD FOR PREPARING CHIRAL 4-ARYL-β-AMINO ACID DERIVATIVE

CROSS-REFERENCE TO RELATED APPLICATIONS

This patent application is a U.S. national stage application under 35 U.S.C. § 371 of International Patent Application No. PCT/CN2021/080631 filed on 12 Mar. 2021, which claims priority to Chinese Patent Application No. 202010394976.7 filed on 11 May 2020. The entire disclosures of the above recited applications are incorporated herein by reference.

FIELD OF THE INVENTION

The present invention relates to a method for preparing enantiomeric enriched β-amino acid derivatives. The β-amino acid derivatives are important intermediates in pharmacy, in particular, relates to a new method for preparing enantiomeric enriched β-amino acid derivatives for synthesizing sitagliptin for the treatment of diabetes.

BACKGROUND OF THE INVENTION

As disclosed in J. Med. Chem. 2005, 48(1):141, a general formula structure II is a dipeptidyl peptidase-IV (DPP-IV) inhibitor and a commercially available drug (Sitagliptin, Januvia) for the treatment of type II diabetes.

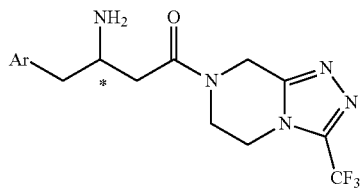

II

As disclosed in WO2004085378, WO2005097733, and WO2006065826, asymmetrically catalysis of enamines is in the presence of rhodium catalysts and Joshiphos ligands. However, special solvents are required, the amount of catalysts is relatively large, and the ee values of the obtained chiral product is relatively low, so as to make the method uneconomical.

As disclosed in WO2009064476, the intermediate chiral β-amino acid derivatives were prepared by asymmetric hydrogenation of enamines using BINAP-RuCl$_2$ as a catalyst. But, the ee values and yields of the obtained chiral products are relatively low.

As disclosed in U.S. Pat. No. 8,278,486/CN102271504, the intermediate chiral β-amino acid derivatives were prepared by asymmetric hydrogenation of enamines using TangPhosRh(COD)BF$_4$ as a catalyst, and the ee value and yield of the obtained chiral products are relatively higher, but the cost of the catalyst ligand is higher, the commercial source is unstable. So there are risks in industrial applications.

SUMMARY OF THE INVENTION

The present invention provides an effective enantioselective mode, and provides a method of preparing a chiral 4-aryl-β-amino acid derivative. The chiral 4-aryl-β-amino acid derivative is a β-amino acid derivative having a structure as shown in Formula I,

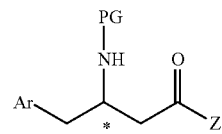

I wherein R-configuration or S-configuration is marked with * in the stereocenter;

the preparation method comprises hydrogenating an enamine compound having a structure as shown in Formula III in an organic solvent in the presence of a catalyst containing a transition metal rhodium and BIBOPs;

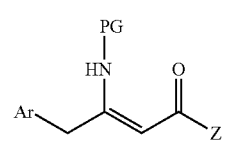

III wherein Ar is a phenyl, substituted with 1-5 substituents or a mixture of 1-5 substituents independently selected from halogen, trifluoromethyl, alkoxy; PG is hydrogen, aldehyde group, acetyl, benzyl, Boc, Cbz, PMB, Fmoc, COOR$^1$, CONR$^2$; Z is OR$^1$, SR and NR$^3$R$^4$; wherein R$^1$=H, C$_{1-6}$ alkyl; R$^2$=H, C$_{1-6}$alkyl or a three-membered to six-membered heterocycle containing nitrogen, oxygen and sulfur; R$^3$ and R$^4$ are each independently H, C$_{1-6}$ alkyl, C$_{4-10}$ cycloalkyl, aryl, or R$^3$ and R$^4$ bonded to a nitrogen atom to be formed a C$_{4-7}$ membered heterocycle having additional heteroatom optionally independently selected from O, S, N—C$_{1-5}$ alkyl.

In the preferred technical solution of the preparation method of the present invention, preferably, the chiral ligands are BIBOPs (its preparation method can refer to U.S. Pat. No. 8,552,212, Org. Lett., 2010, 12(1):176), which has a structure as shown in Formula IV. The ligand BIBOPs has a structure as shown in Formula IV:

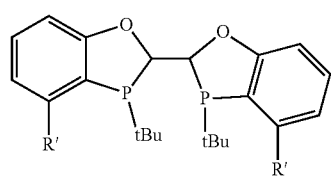

IV wherein, R' is hydrogen, alkyl, halogen, hydroxyl, alkoxy, aryl. Preferably, the configuration is Formula IVa, and R is methoxy.

In the preferred technical solution of the preparation method of the present invention, preferably, the structural configuration as shown in Formula IV is a Formula (S,S,S',S')-IVa and a Formula (R,R,R',R')-IVb,

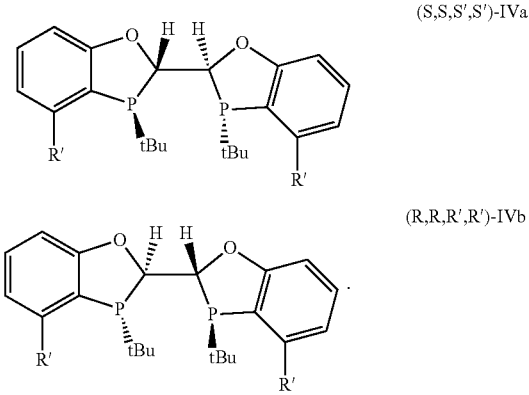

(S,S,S',S')-IVa (R,R,R',R')-IVb

In a preferred technical solution of the preparation method of the present invention, preferably, the transition metal comprises [M(NBD)₂]X, [M(COD)₂]X, wherein X is an uncoordinated anion selected from tetrafluoroborate, hexafluoroantimonate, trifluoromethanesulfonate; M is rhodium, iridium, ruthenium. Wherein COD is 1,5-cyclooctadiene, and NBD is norbornadiene. Preferably, the transition metal is [Rh(NBD)₂]BF₄, [Rh(COD)₂]BF₄.

In the preferred technical solution of the preparation method of the present invention, preferably, the organic solvent is selected from one or more of methanol, ethanol, isopropanol, ethyl acetate, methyl acetate, butyl acetate, tetrahydrofuran, methyl tert-butyl ether, isopropyl ether, toluene, acetone, acetonitrile, dichloromethane and n-heptane. Preferably, the organic solvent is methanol or ethanol.

In the preferred technical solution of the preparation method of the present invention, preferably, the amount of the chiral ligand and the transition metal is 0.001-1 mol %.

In the preferred technical solution of the preparation method of the present invention, preferably, the pressure of hydrogen is 0.1-10 MPa, preferably, 0.1~2.5 MPa.

In a preferred technical solution of the preparation method of the present invention, preferably, the reaction temperature of the hydrogenation is from a room temperature to 100° C., preferably, from a room temperature to 80° C.

In the preferred technical solution of the preparation method of the present invention, preferably, the reaction time of the hydrogenation is 2-36 hours, preferably, 6-24 h.

The preparation method of the chiral β-amino acid derivative (Formula I) of the present invention has beneficial effects as follows: using a small amount of a selected asymmetric catalyst, and having a simple operation, mild reaction conditions, a high yield, a purity up to 99.9%, a high stereoselectivity, and better industrial application and economic values.

DETAILED DESCRIPTION AND PREFERRED EMBODIMENTS THEREOF

Hereafter, the present invention will be described specifically with reference to the examples. The examples are given only for illustration of the technical solution of the present invention and should not be construed to limit the present invention.

Example 1: 5-[1-hydroxy-2-(2,4,5-trifluorophenyl)-ethylidene]-2,2-dimethyl-1,3-dioxane-4,6-diketone

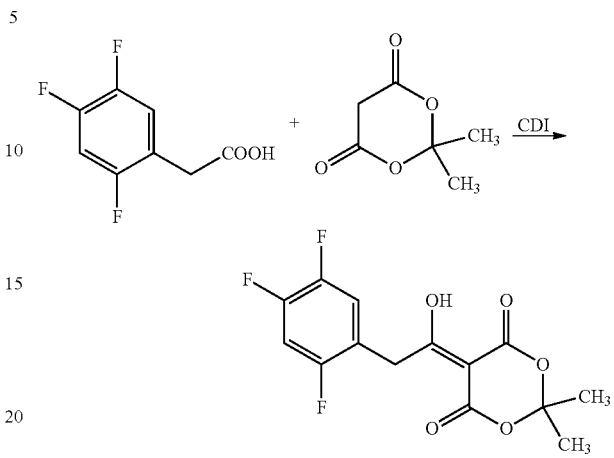

Add tetrahydrofuran (40.0 g) and trifluorophenylacetic acid (10.0 g) to a 250 mL reaction kettle, control a temperature at 0~5° C., add in batches N,N-carbonyldiimidazole (CDI, 9.4 g) to the reaction kettle, and react at a room temperature for 3 h after finishing the addition, and continue to add a Meldrum's acid (8.4 g) to stir at a room temperature for 16 h. And then evaporate solvents under reduced pressure, add water (20.0 g), adjust pH to pH=2 with 1N hydrochloric acid, extract with dichloromethane, wash and dry to obtain white solids [5-[1-hydroxy-2-(2,4,5-trifluorophenyl)-ethylidene]-2,2-dimethyl-1,3-dioxane-4,6-diketone]14.6 g, the yield is 88%. HRMS[M+H]⁺: 317.0628; ¹H-NMR (400 MHz, CDCl₃): 15.50 (s, 1H), 7.13-7.19 (m, 1H), 6.93-6.99 (m, 1H), 4.54 (s, 2H), 1.77 (s, 6H).

Example 2: (Z)-3-amino-4-(2,4,5-trifluorophenyl)-2-methyl Crotonate

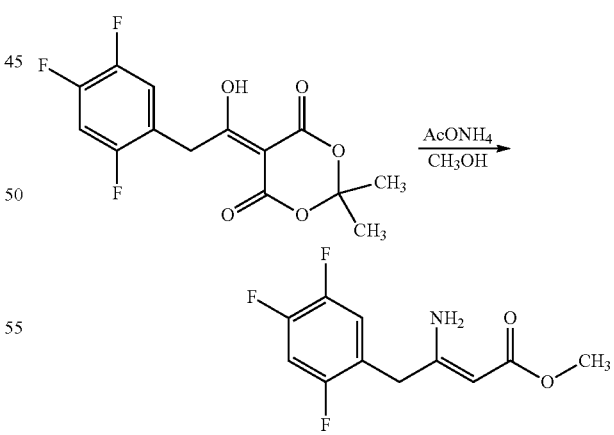

Add methanol (48.0 g), the product 5-[1-hydroxy-2-(2,4,5-trifluorophenyl)-ethylidene]-2,2-dimethyl-1,3-dioxane-4,6-diketone (14.0 g) of Example 1 to a 250 mL reaction kettle, react at 60° C. for 4 h, and then add ammonium acetate (5.0 g), react at 60° C. for 10 h, afterwards concentrate under reduced pressure, add in turn dichloromethane and water, and then extract, wash, dry, and recover solvent to dryness under reduced pressure, to obtain a light yellow solid of [(Z)-3-amino-4-(2,4,5-trifluorophenyl)-2-methyl crotonate] 10.0 g, the yield is 92%. HRMS[M+H]+: 246.0735; ¹H-NMR (400 MHz, CDCl₃): 7.05-7.12 (m, 1H), 6.92-6.98 (m, 1H), 4.57 (s, 1H), 3.65 (s, 3H), 3.41 (s, 2H).

Example 3: (Z)-3-acetamido-4-(2,4,5-trifluorophenyl)-2-methyl Crotonate

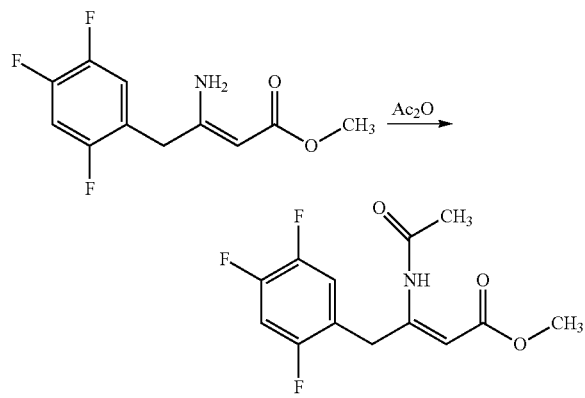

Add tetrahydrofuran (40.0 g), the product (Z)-3-amino-4-(2,4,5-trifluorophenyl)-2-methyl crotonate (10.0 g) of Example 2, acetic anhydride (8.0 g), pyridine (9.0 g) to a 100 mL reaction flask to react under reflux for 20 h, adjust pH to pH=3 with hydrochloric acid. And then evaporate solvents to dryness under reduced pressure, and purify by silica gel to obtain 9.3 g white solid [(Z)-3-acetamido-4-(2,4,5-trifluorophenyl)-2-methyl crotonate] (79% of the yield, 99.8% of HPLC purity). HRMS[M+H]+: 288.0838; ¹H-NMR (400 MHz, CDCl₃): 11.14 (s, 1H), 7.03-7.09 (m, 1H), 6.89-6.96 (m, 1H), 4.82 (s, 1H), 4.15 (s, 2H) 3.71 (s, 3H), 2.15 (s, 3H).

Example 4: (3R)—N-acetyl-3-amino-4-(2,4,5-trifluorophenyl)methyl Butyrate

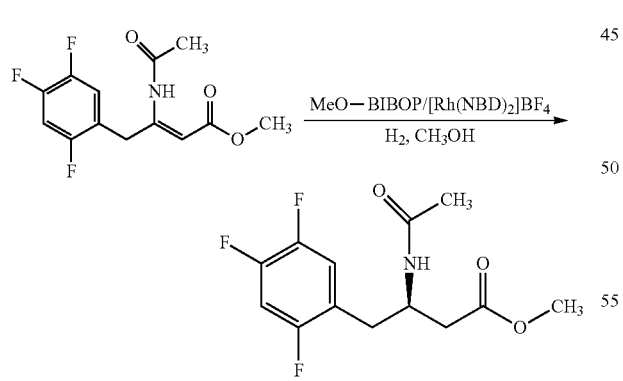

Add methanol (16.0 g), the product (Z)-3-acetamido-4-(2,4,5-trifluorophenyl)-2-methyl crotonate (4.0 g) of Example 3, MeO—BIBOP/[Rh(NBD)₂]BF₄ (2.0 mg) to a hydrogenated kettle, replaced with nitrogen and hydrogen successively, the hydrogen pressure is up to 1.0 Mpa, react at a room temperature for 36 h, and then evaporate solvents to dryness under reduced pressure, to obtain (3R)—N-acetyl-3-amino-4-(2,4,5-trifluorophenyl)methyl butyrate, the quantitative yield is 98.8% ee, and the purity is 99.4%. HRMS[M+H]+: 290.0998; ¹H-NMR (400 MHz, CDCl₃): 7.02-7.09 (m, 1H), 6.87-6.93 (m, 1H), 6.31-6.33 (m, 1H), 4.44-4.45 (m, 1H), 3.71 (s, 3H), 2.87-2.89 (m, 2H), 2.49-2.61 (m, 2H) 1.93 (s, 3H).

Example 5: (3R)—N-acetyl-3-amino-4-(2,4,5-trifluorophenyl)methyl Butyrate

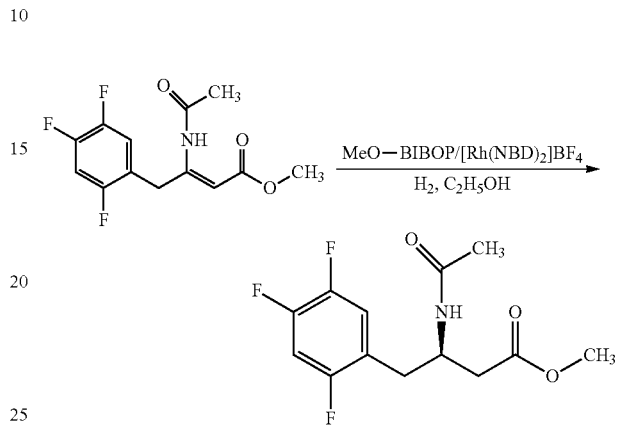

Add ethanol (10.0 g), the product (Z)-3-acetamido-4-(2,4,5-trifluorophenyl)-2-methyl crotonate (2.0 g) of Example 3, MeO—BIBOP/[Rh(NBD)₂]BF₄ (1.0 mg) to a hydrogenated kettle, replace with nitrogen and hydrogen successively, the hydrogen pressure is up to 1.0 Mpa, and afterwards react at 60° C. for 18 h, and then evaporate solvents to dryness under reduced pressure, to obtain (3R)—N-acetyl-3-amino-4-(2,4,5-trifluorophenyl)methyl butyrate, the quantitative yield is 98.5% ee, the purity is 99.4%.

Example 6: (3R)—N-acetyl-3-amino-4-(2,4,5-trifluorophenyl)methyl Butyrate

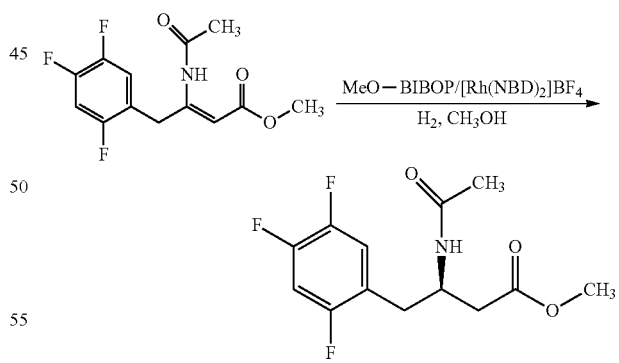

Add tetrahydrofuran (10.0 g), the product (Z)-3-acetamido-4-(2,4,5-trifluorophenyl)-2-methyl crotonate (2.0 g) of Example 3, MeO—BIBOP/[Rh(NBD)₂]BF₄ (1.0 mg) to a hydrogenated kettle, replace with nitrogen and hydrogen successively, the hydrogen pressure is up to 1.5 Mpa, and afterwards react at 50° C. for 10 h, and then evaporate solvents to dryness under reduced pressure, to obtain (3R)—N-acetyl-3-amino-4-(2,4,5-trifluorophenyl) methyl butyrate, the quantitative yield is 98.8% ee, the purity is 99.7%.

Example 7: (3R)—N-acetyl-3-amino-4-(2,4,5-trifluorophenyl)methyl Butyrate

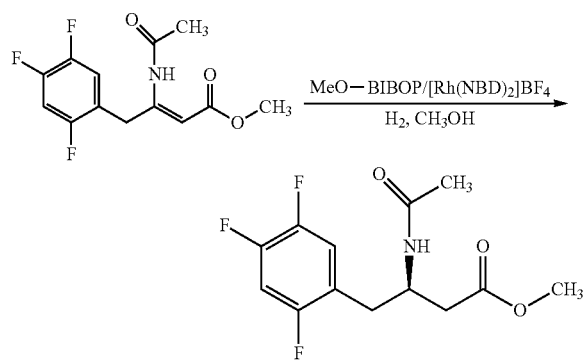

Add methanol (10.0 g), the product (Z)-3-acetamido-4-(2,4,5-trifluorophenyl)-2-methyl crotonate (2.0 g) of Example 3, MeO—BIBOP/[Rh(NBD)$_2$]BF$_4$ (1.0 mg) to a hydrogenated kettle, replace with nitrogen and hydrogen successively, the hydrogen pressure is up to 2.5 Mpa, and afterwards react at 60° C. for 6 h, and then evaporate solvents to dryness under reduced pressure, to obtain (3R)—N-acetyl-3-amino-4-(2,4,5-trifluorophenyl)methyl butyrate, the quantitative yield is 98.2% ee, the purity is 99.8%.

Example 8: (3R)—N-acetyl-3-amino-4-(2,4,5-trifluorophenyl)methyl Butyrate

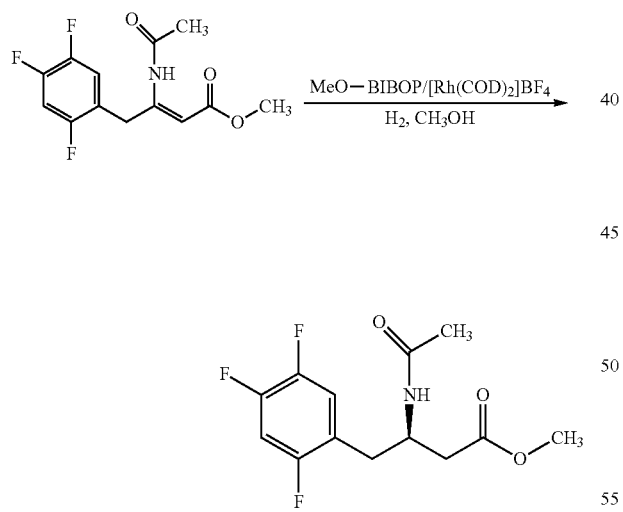

Add methanol (10.0 g), the product (Z)-3-acetamido-4-(2,4,5-trifluorophenyl)-2-methyl crotonate (2.0 g) of Example 3, MeO—BIBOP/[Rh(COD)$_2$]BF$_4$ (1.5 mg) to a hydrogenated kettle, replace with nitrogen and hydrogen successively, the hydrogen pressure is up to 1.0 Mpa, and afterwards react at 40° C. for 24 h, and then evaporate solvents to dryness under reduced pressure, to obtain (3R)—N-acetyl-3-amino-4-(2,4,5-trifluorophenyl)methyl butyrate, the quantitative yield is 98.5% ee, and the purity is up to 99.5%.

Example 9: (3R)—N-acetyl-3-amino-4-(2,4,5-trifluorophenyl)methyl Butyrate

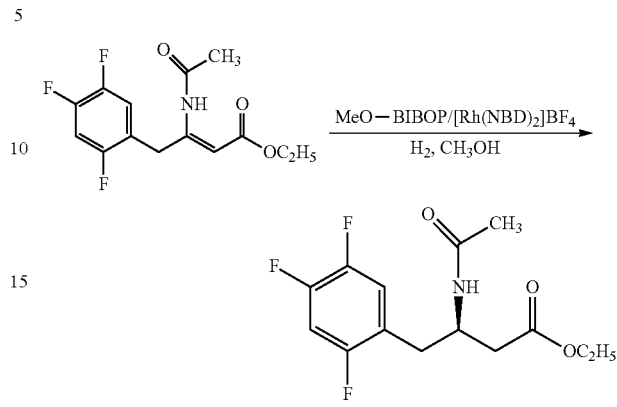

Add methanol (16.0 g), (Z)-3-acetamido-4-(2,4,5-trifluorophenyl)-2-ethyl crotonate (4.0 g), MeO—BIBOP/[Rh(NBD)$_2$]BF$_4$ (2.0 mg) to a hydrogenated kettle, replace with nitrogen and hydrogen successively, the hydrogen pressure is up to 1.0 Mpa, and afterwards react at 50° C. for 14 h, and then evaporate solvents to dryness under reduced pressure, to obtain (3R)—N-acetyl-3-amino-4-(2,4,5-trifluorophenyl) ethyl butyrate, the quantitative yield is 98.7% ee, the purity is 99.8%. HRMS[M+H]$^+$: 304.1150; $^1$H-NMR (400 MHz, CDCl$_3$): 7.04-7.10 (m, 1H), 6.88-6.93 (m, 1H), 6.30-6.33 (m, 1H), 4.42-4.45 (m, 1H) 4.10 (q, J=7.2 Hz, 2H) 3.72 (s, 3H), 2.87-2.90 (m, 2H), 2.49-2.61 (m, 2H) 1.26 (t, J=6.8 Hz, 3H).

Example 10: (3R)—N-acetyl-3-amino-4-(2,4,5-trifluorophenyl)methyl Butyrate

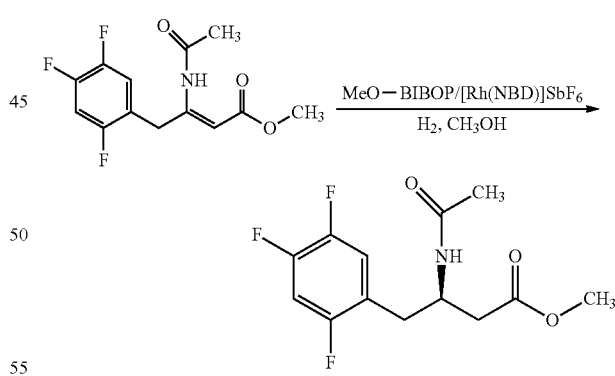

Add methanol (10.0 g), the product (Z)-3-acetamido-4-(2,4,5-trifluorophenyl)-2-methyl crotonate (2.0 g) of Example 3, MeO—BIBOP/[Rh(NBD)]SbF$_6$ (1.5 mg) to a hydrogenated kettle, replace with nitrogen and hydrogen successively, the hydrogen pressure is up to 1.0 Mpa, and afterwards react at 50° C. for 24 h, and then evaporate solvents to dryness under reduced pressure, to obtain (3R)—N-acetyl-3-amino-4-(2,4,5-trifluorophenyl)methyl butyrate, the quantitative yield is 98.0% ee, and the purity is up to 99.0%.

Example 11: (3R)—N-tert-butoxycarbonyl-3-amino-4-(2,4,5-trifluorophenyl)methyl Butyrate

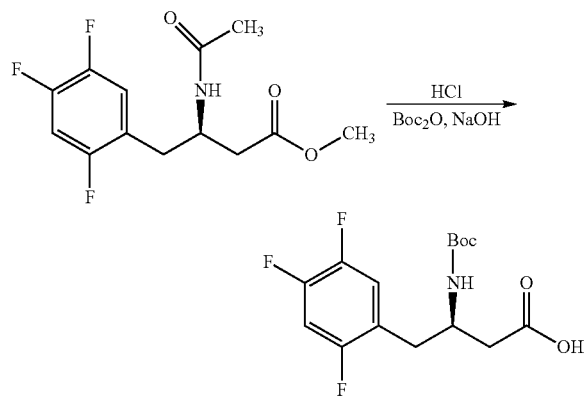

Add (3R)—N-acetyl-3-amino-4-(2,4,5-trifluorophenyl)methyl crotonate (3.0 g) and hydrochloric acid (9.0 g) to a 50 mL reaction flask, react under reflux overnight, and then concentrate under reduced pressure, and afterwards add 2 mol/L NaOH solution to adjust pH>13.5, dropwise add Boc-anhydride (2.7 g), and react at room temperature for 5 h. Add ethyl acetate (9.0 g), adjust pH to pH=2.5-3.5 with 2N hydrochloric acid, layer, extract, wash, and reduce to dryness, to obtain a white solid of (3R)—N-tert-butoxycarbonyl-3-amino-4-(2,4,5-trifluorophenyl)methyl butyrate 3.1 g, the yield is 90%, the purity is 99.7%. HRMS[M+H]$^+$: 334.1276; $^1$H-NMR (400 MHz, DMSO-d$_6$): 12.19 (s, 1H) 7.41-7.48 (m, 1H), 7.24-7.31 (m, 1H), 6.77-6.79 (d, 1H, J=8.8 Hz), 4.00-4.02 (m, 1H), 2.57 (dd, 1H, J=3.2, 13.2 Hz), 2.83 (dd, 1H, J=4.4, 15.2 Hz), 2.40 (d, 2H, J=6.4 Hz) 1.27 (s, 9H).

Example 12: N-Boc Sitagliptin

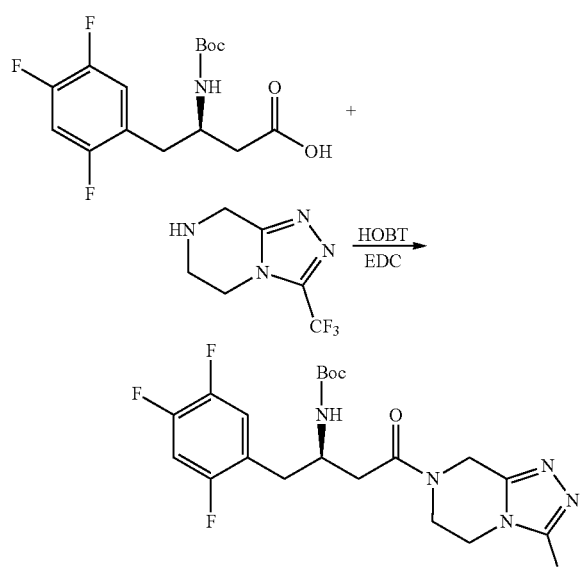

Add dichloromethane (30.0 g), (3R)—N-tert-butoxycarbonyl-3-amino-4-(2,4,5-trifluorophenyl) methyl butyrate (3.0 g), 3-(trifluoromethyl)-5,6,7,8-tetrahydro-[1,2,4] triazolo [4,3-a]pyrazine hydrochloride (2.4 g) to a 250 mL reaction flask, and then add HOBT (1.4 g), EDC·HCl (1.9 g) to the reaction flask, control a temperature to 0.0~10.0° C., and afterwards slowly add DIPEA (3.5 g) and react at a room temperature for 12 h. Add water (70.0 g) after finishing the reaction, evaporate solvents under reduced pressure, add anhydrous ethanol (24.0 g) to raise the temperature to dissolve, and then filter, crystallize by cooling, and then dry to obtain 3.75 g of a white solid (a yield is 82%). HRMS [M+H]$^+$: 508.1666; $^1$H-NMR (400 MHz, DMSO-d$_6$): 7.40-7.47 (m, 1H), 7.29-7.36 (m, 1H), 6.74-6.77 (m, 1H), 4.88-5.04 (m, 2H), 4.22-4.32 (m, 1H), 3.96-4.10 (m, 2H), 2.61-2.89 (m, 4H) 1.24 (s, 9H).

Example 13: Sitagliptin

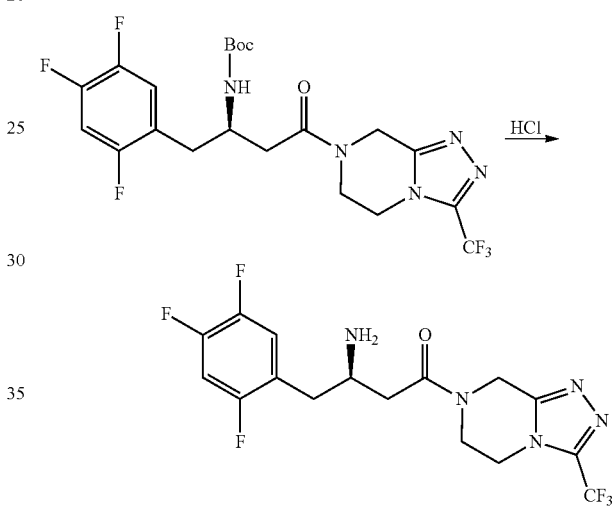

Add in turn methanol (10.0 g) and N-Boc sitagliptin (2.0 g) to a 100 mL reaction flask, slowly add hydrochloric acid (4.5 g) and react at room temperature for 14 h, concentrate under reduced pressure after finishing the reaction, and then add water (2.5 g) under stirring, and adjust pH with the sodium hydrogen solution to pH=8.0-9.0, add ethyl acetate for extraction, and then concentrate under reduced pressure, and recrystallize with isopropanol (10.0 g), to obtain 1.3 g of white solid (yield is 80%, >99.9% ee). HRMS[M+H]$^+$: 408.1260; $^1$H-NMR (400 MHz, D$_2$O) 7.17-7.24 (m, 1H), 7.01-7.11 (m, 1H), 4.82-5.00 (m, 2H), 4.14-4.27 (m, 2H), 3.93-4.01 (m, 1H), 2.91-3.09 (m, 2H), 2.79-2.97 (m, 2H).

Example 14: N-Boc Sitagliptin

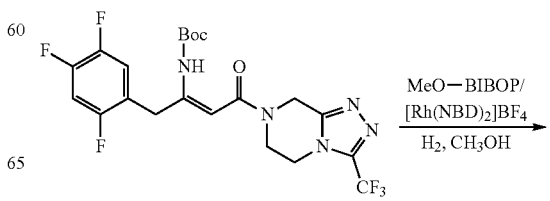

-continued

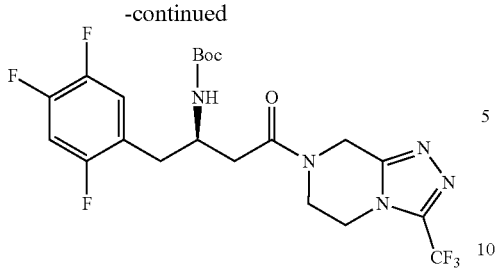

Add methanol (10.0 g), (Z)-tert-butoxycarbonyl-4-oxo-[3-(trifluoromethyl)-5,6-dihydro [1,2,4]triazolo[4,3-a]pyrazinyl-7(8H)-yl]-1-(2,4,5-trifluorophenyl)-butyl-2-en-2-ylcarbamate (2.0 g), MeO—BIBOP/[Rh(NBD)$_2$]BF$_4$ (2.0 mg) to a hydrogenated kettle, replace with nitrogen and hydrogen successively, the hydrogen pressure is up to 1.5 Mpa, and afterwards react at 50° C. for 16 h, and then evaporate solvents to dryness under reduced pressure, to obtain a quantitative yield is 90.0% ee.

Example 15: (3R)—N-acetyl-3-amino-4-(2,4,5-trifluorophenyl) methyl Butyrate

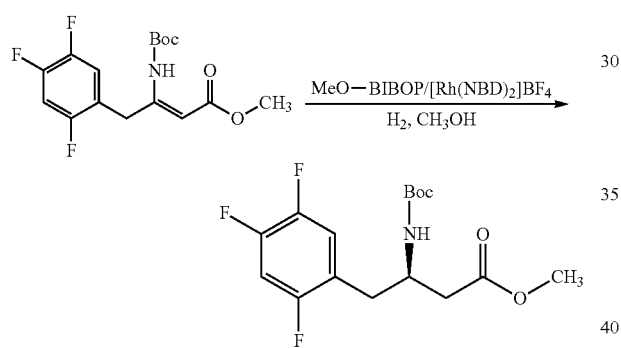

Add methanol (10.0 g), (Z)-3-tert-butoxycarbonylamino-4-(2,4,5-trifluorophenyl)-2-methyl crotonate (2.0 g), MeO—BIBOP/[Rh(NBD)$_2$]BF$_4$ (1.0 mg) to a hydrogenated kettle, replace with nitrogen and hydrogen successively, the hydrogen pressure is up to 1.0 Mpa, and afterwards react at 50° C. for 14 h, and then filter and evaporate to dryness under reduced pressure, to obtain a quantitative yield is 99.3% ee, the purity is 99.9%. HRMS[M+H]$^+$: 348.1421; $^1$H-NMR (400 MHz, CDCl$_3$): 7.04-7.12 (m, 1H), 6.84-6.93 (m, 1H), 5.09-5.12 (m, 1H), 4.10-4.22 (m, 1H), 3.70 (s, 3H), 2.85-2.90 (m, 1H), 2.50-2.61 (m, 1H), 1.40 (s, 9H).

The present invention is not limited by the above-mentioned examples. The above-mentioned examples and descriptions are only for illustrating the principle. Persons skilled in the art can make various modifications to the present invention without departing from the present invention after reading the above-mentioned contents of the present invention. These equivalent forms of modification also fall within the scope of protection of the present invention.

We claim:

1. A method for preparing a chiral 4-aryl-β-amino acid derivative having a structure as shown in Formula I,

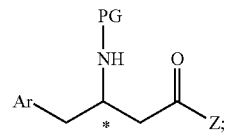

wherein R-configuration or S-configuration is marked with * in the stereocenter;

the method comprising hydrogenating an enamine compound having a structure as shown in Formula III in an organic solvent in the presence of a catalyst containing a transition metal and BIBOPs;

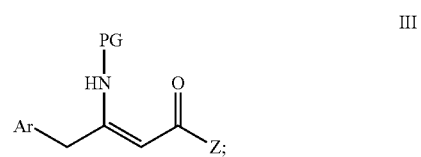

wherein Ar is a phenyl, substituted with 1-5 substituents or a mixture of 1-5 substituents independently selected from halogen, trifluoromethyl, and alkoxy; PG is hydrogen, an aldehyde group, acetyl, benzyl, Boc, Cbz, PMB, Fmoc, COOR$^1$, or CONR$^2$; Z is OR$^1$, SR$^1$ or NR$^3$R$^4$; wherein R$^1$ is H or C$_{1-6}$ alkyl;

R$^2$ is H, C$_{1-6}$ alkyl, or a three-membered to six-membered heterocycle containing nitrogen, oxygen, and sulfur;

R$^3$ and R$^4$ are each independently H, C$_{1-6}$ alkyl, C$_{4-10}$ cycloalkyl, aryl, or R$^3$ and R$^4$ bonded to the nitrogen atom form a C$_{4-7}$ membered heterocycle optionally having an additional heteroatom independently selected from O, S, and N—C$_{1-5}$ alkyl;

wherein the transition metal comprises [M(COD)$_2$]X, wherein X is selected from an uncoordinated anion of tetrafluoroborate, hexafluoroantimonate, and trifluoromethanesulfonate; M is rhodium, iridium, or ruthenium;

wherein a ligand BIBOPs has a structure as shown in Formula IV:

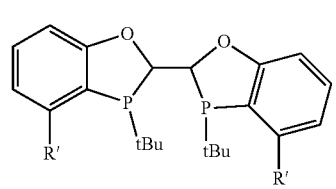

wherein R' is hydrogen, alkyl, halogen, hydroxyl, alkoxy, or aryl.

2. The method according to claim 1, wherein a structural configuration as shown in Formula IV is formula (S,S,S',S')-IVa and formula (R,R,R',R')-IVb,

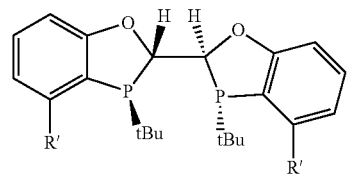

(S,S,S',S')-IVa

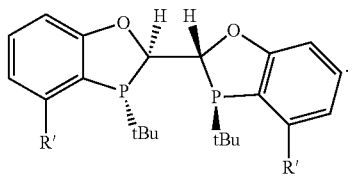

(R,R,R',R')-IVb

3. The method according to claim 1, wherein the organic solvent is selected from one or more of methanol, ethanol, isopropanol, ethyl acetate, methyl acetate, butyl acetate, tetrahydrofuran, methyl tert-butyl ether, isopropyl ether, toluene, acetone, acetonitrile, dichloromethane, and n-heptane.

4. The method according to claim 1, wherein Ar in Formula III is 2,4,5-trifluorophenyl, PG is acetyl, and Z is $OCH_3$.

5. The method according to claim 1, wherein Ar in Formula III is 2,4,5-trifluorophenyl, PG is Boc, and Z is

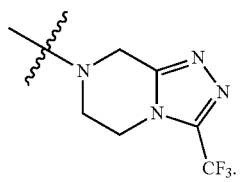 [SMILES: *N1CCn2c(nnc2C(F)(F)F)C1]

6. The method according to claim 1, wherein the pressure of hydrogen is 0.1-10 MPa.

7. The method according to claim 1, wherein the reaction temperature of the hydrogenation is from a room temperature to 100° C.

8. The method according to claim 1, wherein the reaction time of the hydrogenation is 2-36 hours.

* * * * *